(12) United States Patent
Bruck

(10) Patent No.: US 8,353,551 B2
(45) Date of Patent: Jan. 15, 2013

(54) LINEAR LATCH WITH SPRING BIASED ADJUSTMENT BAR FOR USE WITH AN UPPER REAR PIVOTING SEAT BACK

(75) Inventor: Stephen C. Bruck, Howell, MI (US)

(73) Assignee: BAE Industries, Inc., Warren, MI (US)

( * ) Notice: Subject to any disclaimer, the term of this patent is extended or adjusted under 35 U.S.C. 154(b) by 518 days.

(21) Appl. No.: 12/691,488

(22) Filed: Jan. 21, 2010

(65) Prior Publication Data

US 2011/0175419 A1 Jul. 21, 2011

(51) Int. Cl.
*B60N 2/22* (2006.01)

(52) U.S. Cl. ............. 296/65.16; 296/65.17; 297/362.12; 297/363; 297/364

(58) Field of Classification Search ............... 296/65.09, 296/65.16, 65.17; 297/361.1, 362.11, 362.12, 297/363, 364
See application file for complete search history.

(56) References Cited

U.S. PATENT DOCUMENTS

| | | | |
|---|---|---|---|
| 2,066,901 A | 1/1937 | Preble | |
| 4,243,264 A | 1/1981 | Bell | |
| 4,245,866 A | 1/1981 | Bell et al. | |
| 4,279,442 A | 7/1981 | Bell | |
| 4,577,730 A | 3/1986 | Porter | |
| 4,579,386 A * | 4/1986 | Rupp et al. | 297/362.12 |
| 4,898,424 A | 2/1990 | Bell | |
| 5,219,045 A | 6/1993 | Porter et al. | |
| 5,421,640 A | 6/1995 | Bauer et al. | |
| 5,568,843 A | 10/1996 | Porter et al. | |
| 5,618,083 A | 4/1997 | Martone et al. | |
| 5,794,470 A | 8/1998 | Stringer | |
| 5,819,881 A | 10/1998 | Stringer | |
| 5,871,259 A * | 2/1999 | Gehart | 297/362.12 |
| 5,979,986 A * | 11/1999 | Pejathaya | 297/362.12 |
| 5,984,412 A | 11/1999 | Magyar | |
| 6,017,090 A | 1/2000 | Bonk | |
| 6,155,644 A | 12/2000 | Rogala | |
| 6,161,657 A | 12/2000 | Zhuang et al. | |
| 6,279,994 B1 * | 8/2001 | Gehart | 297/362.12 |
| 6,491,344 B1 | 12/2002 | Stumpf et al. | |
| 6,547,332 B2 | 4/2003 | Pejathaya | |
| 6,557,941 B1 | 5/2003 | Heckel, Jr. et al. | |
| 6,568,758 B1 | 5/2003 | Berg et al. | |
| 6,655,741 B2 | 12/2003 | Bonk | |
| 6,761,408 B2 * | 7/2004 | Lim et al. | 297/362.12 |
| 6,948,772 B1 | 9/2005 | Robinson et al. | |
| 6,971,720 B2 | 12/2005 | Bonk | |
| 7,311,360 B2 | 12/2007 | Waligora et al. | |
| 2011/0175419 A1* | 7/2011 | Bruck | 297/364 |

* cited by examiner

*Primary Examiner* — Glenn Dayoan
*Assistant Examiner* — Gregory Blankenship
(74) *Attorney, Agent, or Firm* — Gifford, Krass, Sprinkle, Anderson & Citkowski, P.C.

(57) ABSTRACT

A linear latch interconnecting a pivotally adjustable seatback with a frame location of a vehicle interior. A bracket supported housing pivotally secures to a surface of the frame. An elongated member is supported in linearly displaceable fashion to the bracket and exhibits a plurality of spaced apart apertures. A forward extending end of the member connects to the seatback. A coil spring influences seats over the elongated member and biases the same in a first lineal direction away from the housing. A pair of pins are anchored to an inner support member within the housing and which is biased in a first lateral direction to cause the pins to seat through aligning apertures in the elongated member. A cable retracting mechanism displaces the inner support member in a second opposite direction, causing the pins to outwardly displace from the elongated member and to permit adjustment relative to the housing in order to define a range of seatback motion between upright design and rear recline positions.

22 Claims, 4 Drawing Sheets

LINEAR LATCH WITH SPRING BIASED ADJUSTMENT BAR FOR USE WITH AN UPPER REAR PIVOTING SEAT BACK

FIELD OF THE INVENTION

The present invention relates generally to a linear latch for use with an upper pivoting seatback. More specifically, the present invention discloses a linear latch including a bracket with pivotally secured housing mounted to a vehicle frame location, such as a package shelf surface associated with a sedan-type vehicle. An elongated and spring biased adjustment bar exhibits a plurality of spaced apart apertures defined along its length and is secured in axially displaceable fashion relative to and through the housing. Pins associated with the housing seat through selected apertures in the bar at a determined position. The pins are anchored to an inner support member capable of being displaceable within the housing in order to retract the pins from the bar apertures to permit adjustment of the bar defining a range of seatback motion between upright design and rear recline positions.

BACKGROUND OF THE INVENTION

The prior art is well documented with examples of linear latch designs, such as for use in a vehicle seat recliner. Notable examples include a latch mechanism for a vehicle seat disclosed in Bell, U.S. Pat. No. 4,245,866 which controls the pivotal movement of a seat back relative to a seat bottom. A pair of latches are engageable with an articulated slidable link to latch the seat at a desired reclining position. The latches are manually movable to an unlatched condition to allow relative movement therebetween by the link.

U.S. Pat. No. 4,279,442, also to Bell, teaches a mechanism for controlling reclining movement of a vehicle seat back which includes a pair of pawls engageable with an articulated and slidable ratchet arm for latching the seat at a desired reclining position. The pawls are then manually movable to an unlatched condition relative to the ratchet arm via a pair of pawl control plates for permitting movement of the ratchet arm. Bell, U.S. Pat. No. 4,243,264, discloses a related latch mechanism and having a pair of spring loaded latches engageable with an articulated sliding link.

Other references of note include the linear mechanical lock with one-piece lock housing of Porter, U.S. Pat. No. 5,219,045. Of note, a rod is normally gripped against axial translation through a housing by a coil spring and released by unwinding the spring. The one piece housing integrally contains the spring and related rod bearing elements.

SUMMARY OF THE INVENTION

The present invention discloses a linear latch interconnecting a pivotally adjustable seatback with a frame location of a vehicle interior. A bracket supported housing pivotally secures to a surface of the frame.

An elongated member is supported in linearly displaceable fashion to the bracket and exhibits a plurality of spaced apart apertures. A forward extending end of the member connects to the seatback.

A coil spring influences seats over the elongated member and biases the same in a first lineal direction away from the housing. A pair of pins are anchored to an inner support member within the housing and which is biased in a first lateral direction to cause the pins to seat through aligning apertures in the elongated member.

A cable retracting mechanism displaces the inner support member in a second opposite direction, this causing the pins to outwardly displace from the elongated member. At this point, the elongated member is capable of being readjusted relative to the housing in order to define a range of seatback motion between upright design and rear recline positions, following which the cable retracting mechanism is released and the pins allowed to reseat within the most proximate located apertures in the bar.

Additional features include the housing having a pair of outer package defining members, each of which exhibiting an angled profile and which, upon assembly, defining an interior package defining space for receiving the inner support member. An intermediate member being situated between the outer members and, within one larger dimension defined side, seating the inner support member. The elongate member, or bar, is located in extending fashion between an opposite facing side of the intermediate package member and an opposing inner face of a selected one of the outer package defining members.

The housing also includes a pair of upper and lower three dimensional supports sandwiched between the package defining members. The supports include inwardly and opposing disposed pairs of tabs, these respectively defining seating channels for receiving therebetween upper and lower extending edges of the elongate member.

A pair of upper mounting pins install through aligning upper apertures defined through upper flange portions associated with each of the package defining members and additional apertures defined in the upper support. A lower mounting and pivot pin is further installed through additional apertures located through bottom extending flange locations in each of the package defining members and additional apertures in the support. A pair of angled brackets each include first angled tabs pivotally supporting sides of the lower three dimensional support via the lower pivot pin, the angled brackets further having second angled ends fixedly mounted to the vehicle frame via engaging bolts which extend through apertures in the second ends.

The biasing element further exhibits a main coil spring installed over the elongated member and biasing at a rearward end against a forward face of the assembled housing. A forward end of the coil spring contacts a disk shaped end support mounted in linear displaceable fashion relative to the elongated member for retaining the spring in place during successive compression/translation cycles. The disk support further exhibits a plurality of circumferentially spaced apart locating and supporting tabs seating an outermost coil associated with the spring.

The displaceable pin is further exhibited by a pair of pins, each including an annular enlarged location which seats against the inner support member. A pair of secondary springs are supported about the displaceable pins in biasing contact between the inner support member and a selected one of the outer package defining members. Forward extending portions of the pins extend through a pair of apertures defined in the inner displaceable supporting member to engage the elongate member.

Each of the displaceable pins further include opposite ends extending between the inner support member and the outer package defining member, with extending ends of the pins seating through additional aligning apertures established in the outer package defining member. The pin retracting mechanism further exhibits a spring loaded cable extending through a central opening in a selected outer package defining member and which anchors to a generally central location of the inner displaceable support member.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Figure 1:
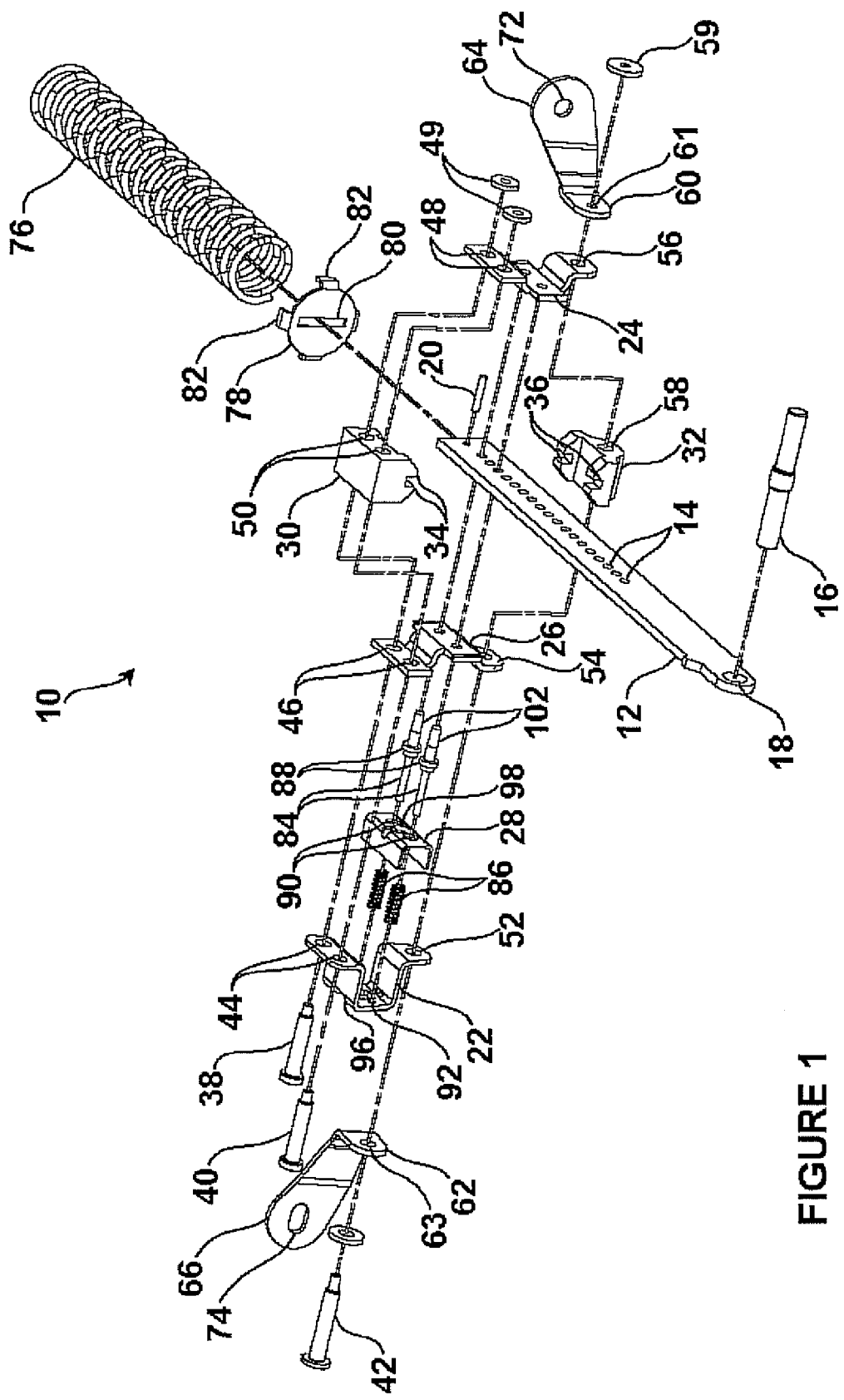
FIG. 1 is an exploded view of linear latch.
Figure 2:
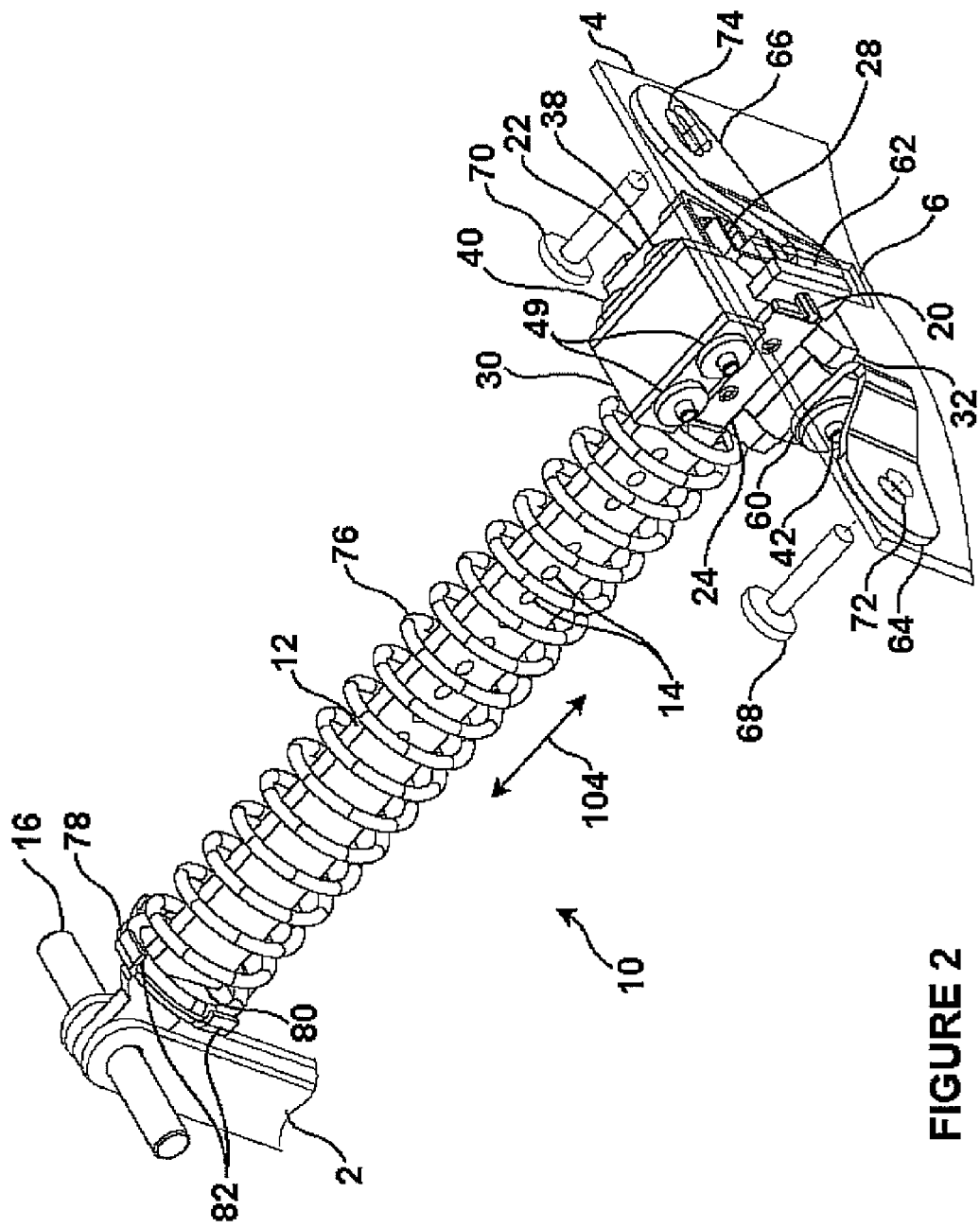
FIG. 2 is an exploded view of the latch shown in FIG. 1.

Referring now to FIGS. 1-4, the present invention relates generally to a linear latch, generally shown at 10 in FIGS. 1 and 2, for use with an upper pivoting seatback. An elongated member, such as generally represented by a bar 12 (such as constructed of a graded steel or similar durable material) is provided and is also understood to encompass any of a rod or any other generally elongated article.

The bar 12 as illustrated exhibits a substantially flattened profile through which are defined, at linear spaced apart intervals, a series of apertures or holes and which are defined by inner closed perimeter surfaces 14 formed in the bar interior. A pin 16 mounts in crosswise fashion to an aperture 18 (FIG. 1) defined at a forward extending end of the bar 12. The pin 16 in turn secures in pivotal permitting fashion to a location associated with a seatback frame sector, see at 2 in FIG. 2. Also illustrated in FIGS. 1 and 2 is a rear end mounted stop pin 20 associated with the bar 12, this cooperating with the bracket supported housing in the manner described below.

A three dimensional housing (also constructed of grade steel or like components) is provided for supporting and securing the rod 12 in linearly displaceable fashion and includes a pair of outer members 22 and 24, each of which exhibiting an angled profile and which, upon assembly, defines an interior package defining space. An intermediate package member 26 (see FIG. 1) is situated between the outer most members 22 and 24 and, within one larger dimension defined side, seats a generally "U" cross sectional shaped and inner displaceable support member 28. The bar 12 is further located in extending fashion between an opposite facing side of the intermediate package member 26 and an opposing inner face of the other outer member 24 (see again FIG. 1).

A pair of upper and lower three dimensional supports 30 and 32 are provided which are sandwiched between the package defining members 22, 24 and 26 and in order to establish the overall housing. The supports 30 and 32 include inwardly and opposing disposed pairs of tabs, see at 34 and 36 in FIG. 1, these respectively defining seating channels for receiving therebetween the upper and lower extending edges of the bar 12.

The housing is secured by a pair of upper mounting pins 38 and 40 and a third lower mounting and pivoting pin 42. As best shown in the exploded view of FIG. 1, the upper mounting pins 38 and 40 install through apertures formed in top end flange locations associated with each of the package members 22 (see apertures at 44), 26 (see apertures at 46) and 28 (see apertures at 48), and secure, via mounting rivets 49 to a reverse outer face of the outer package defining member 24.

Additional and aligning apertures 50 are defined through the intermediately located and upper three dimensional support 30. The lower mounting pin 42 likewise installs through additional apertures located in bottom extending flange locations in each of the package defining members 22, 26 and 28 (see at 52, 54 and 56 respectively) and a further aligning aperture 58 in the lower support 32, and are further anchored by a mounting rivet 59.

As best shown in FIG. 1, a pair of angled brackets are illustrated and each include first angled tabs 60 and 62 pivotally supporting the sides of the lower housing support 32, via the lower extending pivot pin 42 passing through apertures 61 and 63 (FIG. 1). The brackets are further fixedly mounted to the vehicle frame (such as a forwardly facing package shelf location generally represented at 4) at second angled ends 64 and 66, such as further via engaging bolts 68 and 70 (FIG. 1) which extend through apertures 72 and 74 in the second ends 64 and 66.

A coil spring 76 is installed over the bar 12 and (as best shown in FIG. 2) biases at a first (rearward) end against a forward face of the assembled bracket housing. An opposite (forward) end 76 of the spring contacts a disk shaped end support 78 mounted in linear displaceable fashion relative to the bar 12 via an internal channel 80. The disk support 78 further includes a plurality of circumferentially spaced apart locating tabs 82, these seating about an outermost coil of the spring 76 and for retaining the spring in place during successive compression/translation cycles.

Again referring to FIG. 1, a pair of displaceable and selectively seating pins 84 are provided, along with a corresponding pair of biasing springs 86. The pins 84 include annular enlarged central locations which seat against the U shaped inner support member 28, and such as illustrated against an inner facing surface of the member 28, concurrent with forward extending portions of the pins 84 extending through a pair of apertures 90 defined in the inner displaceable supporting member 28, the pins supporting the spring 86 between the inner displaceable support member 28 and the outer package defining member 22 with extending ends of the pins 84 seating through additional aligning aperture 92 established in the outer package defining member 22.

Figure 3:
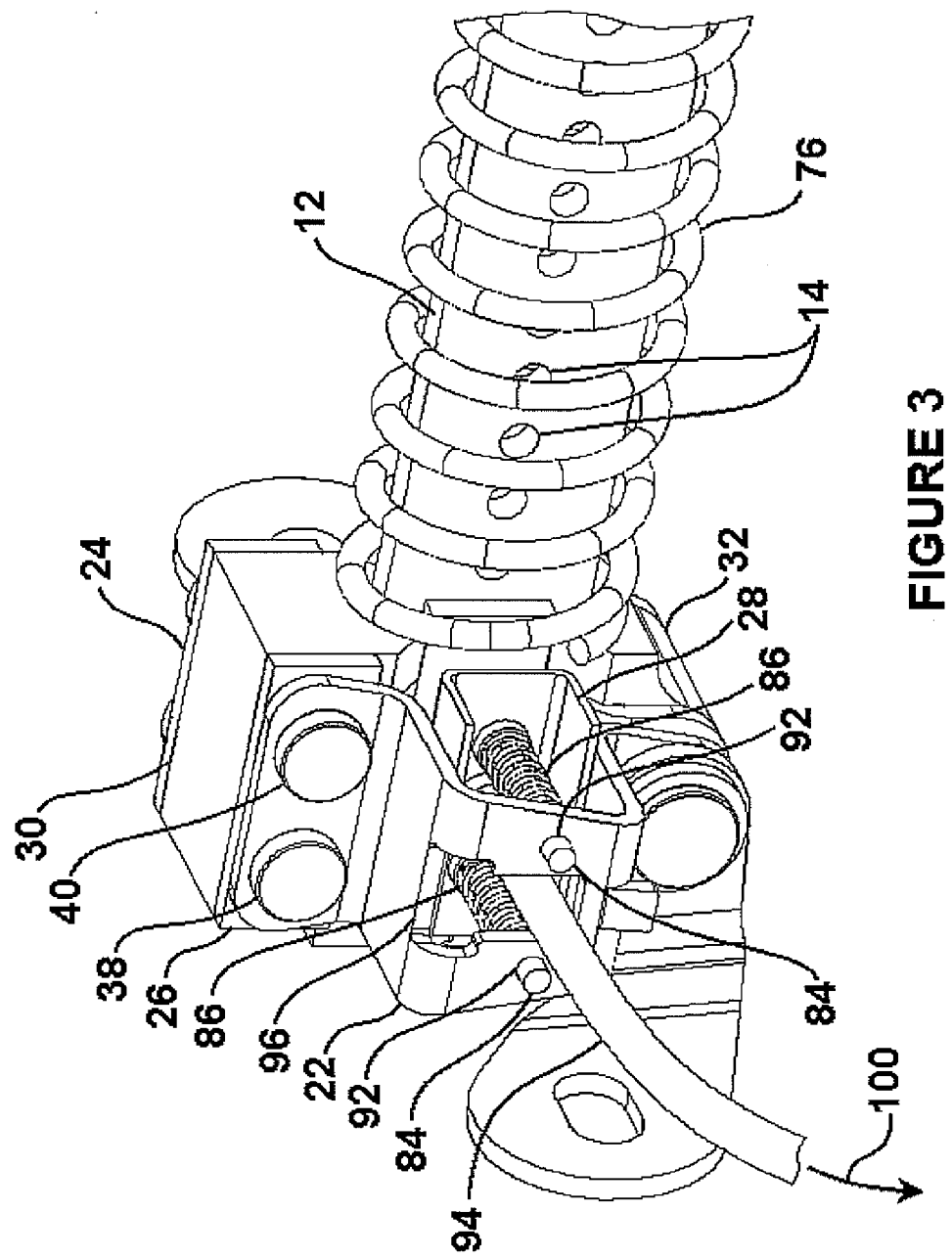
FIG. 3 is an enlarged and rotated sectional view of the engaging interface established between the biased and displaceable bar through the bracket housing and further illustrating the inner displaceable support member and pins in a first engaged position relative to the bar.
Figure 4:
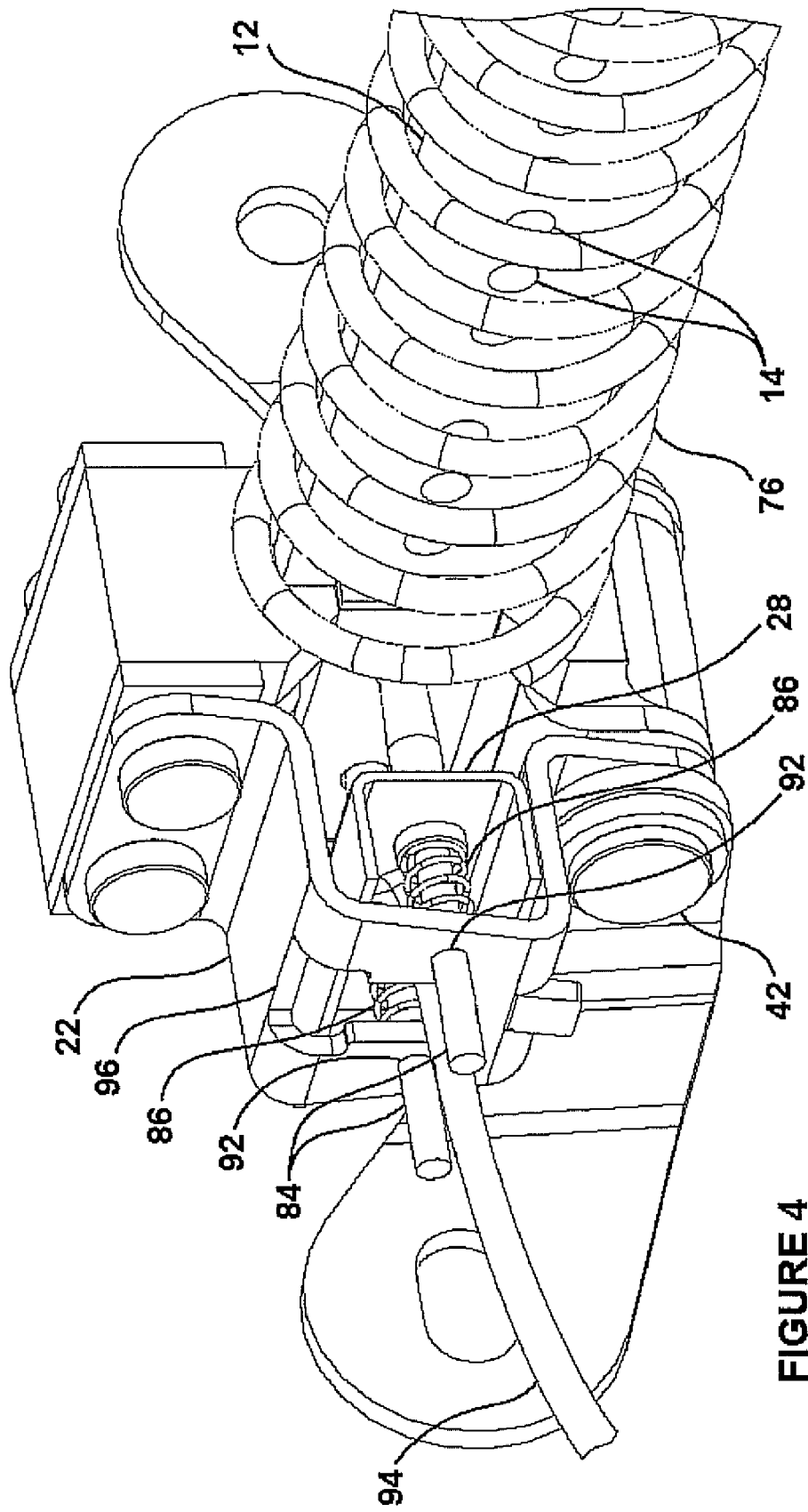
FIG. 4 is a succeeding illustration showing the pin support member in a laterally outwardly displaceable and pin retracting position to permit readjustment of the bar.

A pin retracting mechanism, such as illustrated by a spring loaded cable, see at 94 in FIGS. 3 and 4, extends through a central opening 96 in the outer packaging member 22 and anchors to a generally central location, at 98 in FIG. 1, of the inner displaceable member 28. As represented in the engaged positions of FIGS. 2 and 3, the pins 84 seat through selected apertures 14 in the elongated bar 12 to define a selected overall length of the bar 12 extending in a forward direction of the bracket housing. The representation of FIGS. 2 and 3 illustrates the bar 12 in a most forward position, in which the rear end located stop pin 20 abuts a rear ledge of the lower support 32 (again FIG. 2) and prevents the biasing spring 76 from forwardly displacing the bar 12 out of contact with the housing. Also representatively shown at 6 in FIG. 2 is a window understood to be associated with the rear package shelf (frame 4) and which, upon inwardly displacing the bar 12 concurrent with rotating the seatback sector 2 rearwardly, causes the bar 12 to displace into an open interior behind the frame 4.

The cable 94 is capable of being linearly displaced (see as generally represented by arrow 100 in FIG. 3), such as via a lever or the like (not shown) and which is located at an opposite end of the cable 94 and such as in proximity to a seat bottom in order to be easily accessible to a seat occupant. As further illustrated in FIG. 4, and upon displacing the cable 94 outwardly in the direction of arrow 100 in FIG. 3, the inner and "U" shaped support 28 to which the inner end of the cable secures is caused to outwardly displace in a direction towards the outer packaging member 22, against the force of the coil springs 86 seated over the pins 84 and, along with the abutment created between the enlarged intermediate annular locations 88 of the pins, causes their addition and inner extending end portions, see at 102 in FIG. 1, to retract and unseat from associated apertures 14 in the elongated member or bar 12.

In this position, the exerting force of the spring 76 biases the bar 12 in a forward direction, however this can be overcome by the occupant exerting a reverse and rearward force in order to cause the seatback 2 to pivot in a direction towards the rear shelf support 4, concurrent with the length of the bar 12 extending in either of opposite directions generally represented by arrow 104 in FIG. 2, with the housing further pivoting relative to the brackets along a pivot established by lower pin 42. Upon achieving a desired angular orientation of the seatback 2, the cable 100 is released and the inwardly seating end portions 102 of the pins 86 are allowed to seat through the most proximately located apertures 14 in the bar.

Additional variants contemplate the provision of either a single seating pin or, alternatively, multiple seating pins additional to the two shown. Additional to the configuration of pins represented, it is also possible that other types of seating/retractable structure can be alternatively employed for securing the bar 12 at selected lineal positions.

The cable can also be reconfigured to include an outer stationary portion secured to a location associated with the housing component 22, with an inner translating portion extending from the outer portion and engaging the supporting location of the inner displaceable member 28. It is also envisioned that the main biasing coil spring 76 can be reconfigured to bias the bar 12 in a reverse (rearward) direction rather than the forward direction shown. Alternatively, the biasing element for the bar 12 can be reconfigured as a leaf, torsional or other configured spring, as well as any other suitable element for influencing the bar in a selected direction.

Having described our invention, other and additional preferred embodiments will become apparent to those skilled in the art to which it pertains and without deviating from the scope of the appended claims.

I claim:

1. A linear latch interconnecting a pivotally adjustable seatback with a frame location of a vehicle interior, said latch comprising:
   a bracket supported housing securing to a surface of the frame;
   an elongated member supported in linearly displaceable fashion relative to and through said housing, said elongated member exhibiting a plurality of spaced apart apertures, a forward extending end of said member connecting to the seatback;
   a biasing element for influencing said elongated member in a first lineal direction relative to said housing;
   at least one displaceable pin anchored to an inner support member within said housing and which is biased in a first direction to seat through one or more selected apertures in said elongated member; and
   a retracting mechanism for displacing said inner support member in a second opposite direction, causing said pin to outwardly displace from said elongated member to permit adjustment of said member relative to said housing to define a range of seatback motion between upright design and rear recline positions.

2. The invention as described in claim 1, said housing further comprising a pair of outer package defining members each of which exhibiting an angled profile and which, upon assembly, defining an interior package defining space for receiving said inner support member.

3. The invention as described in claim 2, further comprising an intermediate member situated between said outer package defining members and, within one larger dimension defined side, seating said inner support member.

4. The invention as described in claim 3, said elongate member being located in extending fashion between an opposite facing side of said intermediate package member and an opposing inner face of a selected one of said outer members.

5. The invention as described in claim 4, further comprising a pair of upper and lower three dimensional supports sandwiched between said package defining members, said supports including inwardly and opposing disposed pairs of tabs respectively defining seating channels for receiving therebetween upper and lower extending edges of said elongate member.

6. The invention as described in claim 5, further comprising a pair of upper mounting pins installing through aligning upper apertures defined through upper flange portions associated with each of said package defining members and additional apertures defined in said upper support, a lower mounting and pivot pin installing through additional apertures located through bottom extending flange locations in each of the package defining members and additional apertures in said support.

7. The invention as described in claim 6, further comprising a pair of angled brackets each including first angled tabs pivotally supporting sides of said lower three dimensional support via said lower pivot pin, said angled brackets further comprising second angled ends fixedly mounted to the vehicle frame via engaging bolts which extend through apertures in the second ends.

8. The invention as defined in claim 1, said biasing element further comprising a coil spring installed over said elongated member and biasing at a rearward end against a forward face of said housing, a forward end of said spring contacting a disk shaped end support mounted in linear displaceable fashion relative to elongated member for retaining said spring in place during successive compression/translation cycles.

9. The invention as described in claim 8, said disk support further comprising a plurality of circumferentially spaced apart locating and supporting tabs seating an outermost coil associated with said spring.

10. The invention as described in claim 2, said at least one displaceable pin further comprising a pair of pins, each including an annular enlarged location which seats against said inner support member, a pair of secondary springs supported about said displaceable pins in biasing contact between said inner support member and a selected one of said outer package defining members, forward extending portions of said pins extending through a pair of apertures defined in said inner displaceable supporting member to engage said elongate member.

11. The invention as described in claim 10, each of said displaceable pins further comprising opposite ends extending between said inner support member and said outer package defining member, with extending ends of said pins seating through additional aligning apertures established in the outer package defining member.

12. The invention as described in claim 2, said pin retracting mechanism further comprising a spring loaded cable extending through a central opening in a selected outer package defining member and anchoring to a generally central location of said inner support member.

13. A linear latch interconnecting a pivotally adjustable seatback with a frame location of a vehicle interior, said latch comprising:
- a housing pivotally supported to the frame by a bracket;
- an elongated bar exhibiting a substantially flattened profile and which is supported in linearly displaceable fashion relative to and through an interior of said housing, said bar having a plurality of apertures defined in spaced apart fashion along its extending length, a forward extending end of said bar connecting to the seatback;
- a coil spring installed over said bar and biasing at a rearward end against a forward face of said housing, a forward end of said spring contacting a disk shaped end support mounted in linear displaceable fashion relative to elongated member and influencing said bar in a first lineal direction away from said housing;
- at least one pin anchored to an inner support member displaceable within an open interior of said housing and which is biased in a first direction to seat through at least one of said apertures in said bar; and
- a retracting mechanism for displacing said inner support member in a second opposite direction, causing said pin to outwardly displace from said bar to permit adjustment relative to said housing, and in order to define a range of seatback motion between upright design and rear recline positions.

14. The invention as described in claim 13, said housing further comprising a pair of outer package defining members each of which exhibiting an angled profile and which, upon assembly, defining an interior package defining space for receiving said inner support member, an intermediate member situated between said outer members and, within one larger dimension defined side, seating said inner and displaceable support member.

15. The invention as described in claim 14, said bar being located in extending fashion between an opposite facing side of said intermediate package member and an opposing inner face of a selected one of said outer package defining members.

16. The invention as described in claim 15, further comprising a pair of upper and lower three dimensional supports sandwiched between said package defining members, said supports including inwardly and opposing disposed pairs of tabs respectively defining seating channels for receiving therebetween upper and lower extending edges of said elongate member.

17. The invention as described in claim 16, further comprising a pair of upper mounting pins installing through aligning upper apertures defined through upper flange portions associated with each of said package defining members and additional apertures defined in said upper support, a lower mounting and pivot pin installing through additional apertures located through bottom extending flange locations in each of the package defining members and additional apertures in said upper support.

18. The invention as defined in claim 17, further comprising a pair of angled brackets each including first angled tabs pivotally supporting sides of said lower three dimensional support via said lower pivot pin, said angled brackets further comprising second angled ends fixedly mounted to the vehicle frame via engaging bolts which extend through apertures in the second ends.

19. The invention as described in claim 13, said disk support further comprising a plurality of circumferentially spaced apart locating and supporting tabs seating an outermost coil associated with said spring.

20. The invention as described in claim 14, said at least one displaceable pin further comprising a pair of pins, each including an annular enlarged location which seats against said inner support member, a pair of secondary springs supported about said displaceable pins in biasing contact between said inner support member and a selected one of said outer package defining members, forward extending portions of said pins extending through a pair of apertures defined in said inner displaceable supporting member to engage said elongate member.

21. The invention as described in claim 20, each of said displaceable pins further comprising opposite ends extending between said inner support member and said outer package defining member, with extending ends of said pins seating through additional aligning apertures established in the outer package defining member.

22. The invention as described in claim 14, said pin retracting mechanism further comprising a spring loaded cable extending through a central opening in a selected outer package defining member and anchoring to a generally central location of said inner support member.

* * * * *